United States Patent [19]

Forrest

[11] Patent Number: 4,673,939
[45] Date of Patent: Jun. 16, 1987

[54] TEST APPARATUS IN A RADAR SYSTEM

[75] Inventor: John R. Forrest, Aldenham Herts, United Kingdom

[73] Assignee: Telefonaktiebolaget L M Ericsson, Stockholm, Sweden

[21] Appl. No.: 837,050

[22] Filed: Mar. 6, 1986

[30] Foreign Application Priority Data

Mar. 8, 1985 [SE] Sweden ............................ 8501143

[51] Int. Cl.[4] .............................................. G01S 7/40
[52] U.S. Cl. .................................................. 342/174
[58] Field of Search ................ 342/54, 165, 167, 169, 342/170–174, 368, 371, 372, 376, 377

[56] References Cited

U.S. PATENT DOCUMENTS

| 3,018,478 | 1/1962 | Skillman et al. | 342/171 |
| 3,604,000 | 9/1971 | Briana et al. | 342/173 |
| 4,160,975 | 7/1979 | Steudel | 342/377 X |
| 4,241,351 | 12/1980 | Shreve | 342/368 |
| 4,373,160 | 2/1983 | Cooper | 342/372 |
| 4,445,119 | 4/1984 | Works | 342/377 |
| 4,488,155 | 12/1984 | Wu | 342/376 |
| 4,507,662 | 3/1985 | Rothenberg et al. | 342/376 |
| 4,517,570 | 5/1985 | Gray, Jr. | 342/372 |
| 4,536,766 | 8/1985 | Frazita | 342/372 |

FOREIGN PATENT DOCUMENTS 0107607  7/1982  Japan ................. 342/368

OTHER PUBLICATIONS

Frappe et al., "Liaisons Optiques Appliquées aux Antennes à Balayage Électronique"; Revue Technique Thomson CSF, (vol. 14, No. 2; 6/82; pp. 475–483).
Psaltis et al., "Iterative Optical Processor (IOP) for Adaptive Phased Array Radar Processing"; Conf. Procs. of the Soc. of Photo-Optical Instr. Engs. (1979); pp. 114–119.

Primary Examiner—Thomas H. Tarcza
Assistant Examiner—Bernarr Earl Gregory
Attorney, Agent, or Firm—Burns, Doane, Swecker & Mathis

[57] ABSTRACT

A test apparatus for the reception channels, e.g. in a doppler radar system with electrically controlled aerial elements (A1–An). Behind each aerial element there are optical detectors (O1–On) arranged for receiving an optical signal from the system transmitter and converting it to an RF signal. The latter is sent to the transmitter-receiver modules (M1–Mn) of the system and further to a detection-measurement unit (3). The measurement unit evaluates the different modules (M1–Mn) with relation to amplitude and phase of the test signal, and sends correction signals to the modules in response to the evaluation. The apparatus can also be utilized for testing the system transmission channels.

2 Claims, 4 Drawing Figures

TEST APPARATUS IN A RADAR SYSTEM

TECHNICAL FIELD

The present invention relates to test apparatus in a radar system with an electrically controlled aerial, so-called ESA aerial, with the object of continuously under operation of the system causing mutual conformity with regard to both phase and amplitude of the send and receive signals. The test apparatus is utilizable for suppressing aerial side lobes in such as a doppler radar system.

BACKGROUND ART

Small aerial side lobes in height and laterally are desired in radar systems for several reasons, e.g. to minimize the action of active jamming transmitters or strong ground echoes (clutter). For a conventional aerial, e.g. a reflector aerial, the side lobe level is dimensioned from the appearance of the illumination function. For an electrically controlled aerial (ESA) with a plurality of active transmitter-receiver modules the phase and amplitude similarity between the different modules will be dimensioning for the side lobe level.

In the literature the mean side lobe level is generally given according to $$SL_M = SL_O + (\sigma^2/\eta N)$$

where
$SL_O$ = the side lobe level due to the illumination function
$\eta$ = aerial efficiency
$N$ = number of modules
$\sigma^2$ = amplitude-phase error between transmitter-receiver modules.

If it is desired to realize, for example, 40 dB side lobes with say 200 modules, this means a similarity requirement of <0.5 dB and some degrees between the modules, which is very difficult to achieve with today's technique, particularly if performance shall be maintained over a large temperature range. Each module must consequently be calibrated in a simple manner during operation, i.e. a calibration signal with known phase and amplitude must be fed to each of the aerial elements, and the same signal must be measured on the output of the respective module. The difficulty here is in being able to feed a calibration signal of sufficient accuracy to a sufficiently large number of modules.

It is already known to connect an extra calibration aerial into the remote or immediate field of the existing radar aerial, so that the signals of the extra aerial are received/transmitted through the radar system. It is also known to feed a test signal behind the aerial via wave conductors, coaxial, stripline or microstrip transmission and to evaluate the signals from the different elements, with the object of getting the amplitude and phase of the different signals as uniform as possible.

DISCLOSURE OF INVENTION

The present invention is based on the above-mentioned known methods, but utilizes light energy which is transmitted via optical fibre conductors between the aerial elements and the central receiver (known) of the radar system. The signals which are fed via the light conductors constitute test signals, and these test signals are converted to RF signals and are allowed to pass through the transmitter-receiver modules of the system before they are evaluated in the receiver. Alternatively, the test signals constitute RF signals through said modules, these signals being converted to light signals which are transmitted to the system receiver via optical fibre conductors, where evaluation takes place. Both alternatives above (reception and transmission alternatives) may also be combined such that calibration for both transmitter and receiver channels can be carried out.

The object of the present invention is thus to provide a test apparatus for a radar with a phase-controlled group aerial, this test apparatus giving accurate phase and amplitude equality between the signals to or from the different aerial elements.

The test apparatus is accordingly characterized as will be apparent from the characterizing portion of claim 1.

BRIEF DESCRIPTION OF DRAWINGS

The invention will now be described in detail with reference to the accompanying drawings, where.

BEST MODE FOR CARRYING OUT THE INVENTION

Figure 1:
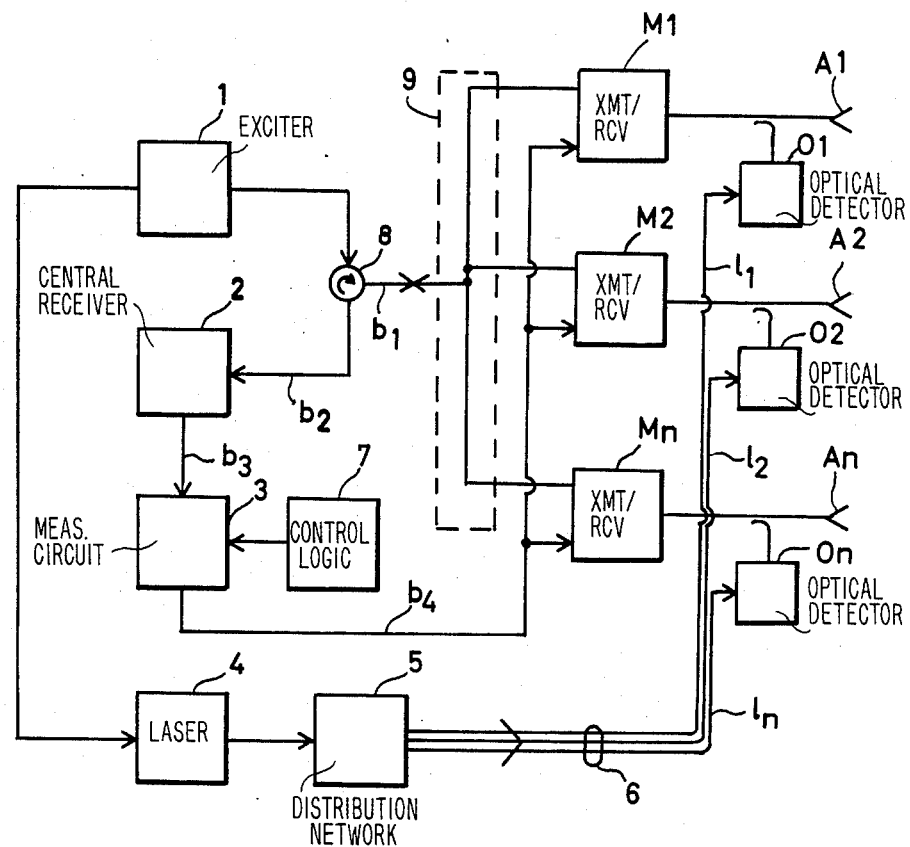
FIG. 1 is a block diagram of the test apparatus in accordance with the invention in a radar system for reception.

In the block diagram of FIG. 1, the test apparatus in accordance with the invention is illustrated together with certain units of the radar system in which the reception signals are to be tested in respect of amplitude and phase after having passed the transmitter-receiver modules.

A high frequency generator or exciter 1 generates the transmission signal of the radar system at a given selected frequency within the radar frequency range, e.g. within the X band. One output of the exciter 1 is connected to a transmitter-receiver switch 8 for transmission of the signal to a plurality n transmitter-receiver modules M1, M2 ... Mn, via a distribution network 9. In the network 9 the transmission signal is divided up so that each module M1-Mn obtains an 1/n part of the transmitter power. As will be seen below from FIG. 2, each module has a transmitter branch and a receiver branch. There is a phase shifter in the transmitter branch for lobe control, a so-called vector modulator, two transmitter-receiver switches and power amplifier. The output of each module (which constitutes the input for received signals to the system) is connected to the aerial elements A1, A2 ... An, respectively. The aerial elements form an electrically controlled group aerial, i.e. an aerial in which the lobe direction can be changed by controlling the phase of the transmission signals to the different aerial elements A1-An. Such aerials are known per se in radar technique, cf. the above.

Since the relative phase angle and amplitude similarity between the signals to the different aerial elements is decisive for the aerial diagram of the radar, it is obviously of great importance that the phase angle of the individual elements is carefully determined, and that this relative phase angle does not change during operation of the radar system. Particularly, there occur undesired side lobes in height and laterally in the radiation diagram of the aerial, and these must be kept at as low a value as possible. This requirement results in that apart from equal relative phase angle being striven for, equality in amplitude of the signals fed to the aerial elements and received from the elements is also striven for.

The apparatus according to the present invention intends to supplement the radar system with the object of meeting the requirement according to the above.

The apparatus contains a light generating unit 4, suitably a laser, connected to the output of the high frequency generator or exciter 1. The laser 4 is connected to an optical distribution network 5 and sends a light signal of a given frequency, which is divided in the distribution network 5 substantially equally for feeding to a bundle of optical fibres 6. The light signals through the fibres in the bundle 6 are carriers of the radar signal sent by the exciter, this signal thus being taken with a given phase and amplitude to a plurality of optical detectors O1, O2 . . . On. In each of these the light signals are converted to radio frequency signals. Each detector O1-On is connected via a direction switch (only indicated in FIG. 1) nearest behind the respective aerial element A1, . . . An. An HF signal is thus fed via an optical fibre signal wave from the exiter 1 to each transmitter-receiver module M1-Mn. This HF signal constitutes a test signal for calibrating the reception path of the radar system with relation to the relative amplitude and phase angle of the modules M1-Mn.

Figure 2:
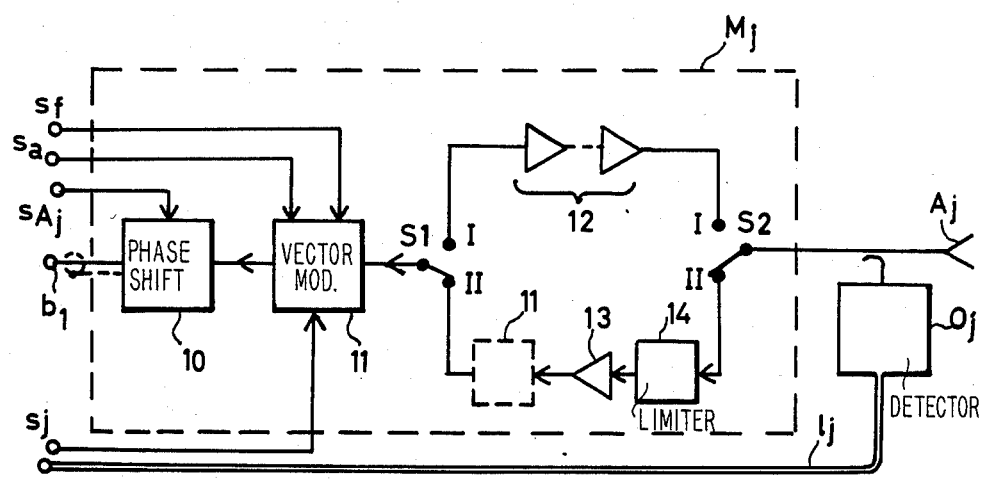
FIG. 2 is a block diagram of a transmitter-receiver module included in the system according to FIG. 1.

FIG. 2 illustrates in detail the appearance of a transmitter-receiver module M1-Mn. A phase-shifting circuit 10 has its input connected via a coaxial connection to the transmitter-receiver switch 8 according to FIG. 1. The phase shifter 10 further has a control input for controlling the phase angle of the incoming or received signal with the object of varying in a manner known per se the phase of the signal fed to the aerial element Aj. A vector modulator 11 is connected to the output of the phase shifter and comprises an amplitude-phase modulator. This is controllable so that the phase and amplitude of the transmission or reception signals may be corrected in accordance with the principle of the present invention. A switch 51 is connected to the output of the modulator 11 for dividing the module into a transmission and a reception path.

A plurality of power amplifiers 12 are connected into the transmission path, and in the reception path there is a low-noise amplifier 13 as well as a limiting circuit 14 for security purposes. A second switch S2 connects the transmission or reception path to the aerial unit Aj. All units in the module apart from the vector modulator are included in known embodiments. In one embodiment of the module Mj, the phase shifter 10 and vector modulator 11 may be common for both transmission and reception, as illustrated in FIG. 2. In systems where there are requirements for small side lobes only for reception, the vector modulator 11 can be suitably placed at the output of the amplifier 13 in the receiver branch.

With the object of achieving equal amplitude and phase in the receiver branch for the modules M1-Mn, when the aerial lobe is directed at right angles to the plan of the aerial element, i.e. so that the aerial emits straight forward, a test signal is fed from the exciter 1 through the units 4, 5, fibre bundle 6 and detectors O1-On. The test signals to the respective aerial element and to the respective module must be equal in amplitude and phase in such a case, since they constitute the reference for calibrating the modules. With the aid of the switches S1 and S2 in mode II (the reception mode) the test signal passes through the amplifier 13 and through the vector modulator 11, phase shifter 10 and arrives at the central receiver 2. The test signals from remaining modules come in in the same way via the connections (bus lines) $b_1$ and $b_2$. The signals are taken further over the line $b_3$ to the phase and amplitude measurement circuit 3. Measurement and comparison of the test signals from two modules are carried out in this circuit first with relation to the amplitude between them. Measurement and comparison relating to all modules is carried out in the measurement circuit 3, first with relation to the amplitude, and a reference module is determined, e.g. by mean value formation. Deviation in amplitude between the reference module and the respective remaining modules gives the correction signals which are transmitted via the line $b_4$ to the vector modulators of the respective module, and come in over the control input $s_a$, according to FIG. 2. A correction of the signal amplitude in response to the correction signal applied to the input $s_a$ then takes place in the vector modulator.

After correcting the amplitude there is a measurement of the phase angle of the modules relative the phase angle of the reference module. A correction signal is generated and sent from the measurement unit 3 via the bus line $b_4$ and from there via the input $s_f$ to the vector modulator 11, a correction of the phase angle of the incoming signal then taking place in the modulator 11. The phase correction is carried out so that the received signal from the module $M_j$, the phase angle of which is to be corrected, is phase shifted 180° in the phase shifter 10. A comparison then takes place in the measurement unit 3 of the reference phase (0°) and with the received signal from the module $M_j$ (phase shifted 180°) by addition of the reference signal and the received signal. If the module $M_j$ then has a correct phase angle an error signal=0 is obtained at the input $s_f$. There is otherwise obtained an error signal $\Delta\phi$ which is fed to the input $s_f$ as a correction signal.

The test signal, the frequency which can be determined by an outside command, is equal to the frequency for which the receiver is set, and is generated in the system exciter 1.

A control logic unit 7 is arranged for controlling the connection sequence for amplitude and phase correction of the different modules M1-Mn. The unit 7 is suitably arranged in conjunction with the detector measurement unit 3. Each transmitter-receiver module M1-Mn has its individual address in the control logic unit 7, so that when the respective correction signal is calculated, it is sent together with the address of the respective module on the common bus line $b_4$. Administration of this communication is catered for by the control logic unit 7.

Figure 3:
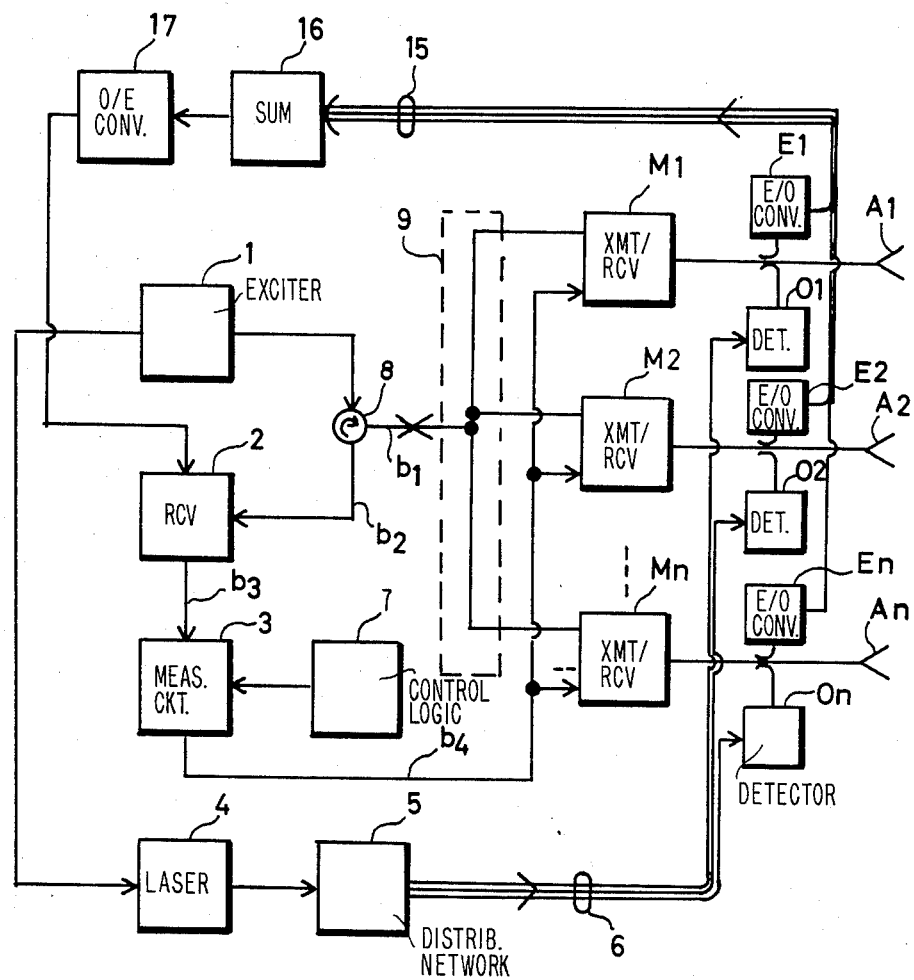
FIG. 3 illustrates the test apparatus in the system according to FIG. 1 during transmission.

FIG. 3 is a block diagram over another embodiment of the test apparatus in accordance with the invention for uniform amplitude and phase in transmission, i.e. putting the transmission branches of the modules into mutual conformity. The block diagram according to FIG. 3 corresponds to the diagram according to FIG. 1, but has been supplemented by an electro-optical converter E1-En, connected to the outputs of the modules M1-Mn to receive the transmission signal which passes each module from the system exciter 1. The converters E1-En each suitably consists of a laser diode which is modulated by the transmission signal. The optical output of each converter E1-En is connected via a bundle 15 of optical fibres to an optical summation network 16. The network 16 has an output connected to the input of an optoelectrical converter 17, which is connected to the receiver 2 of the system. In each module according to FIG. 2 the vector modulator 11 is connected as illustrated, i.e. in the common signal branch.

A part of the transmitted power of the respective module is fed to the converters E1-En and to the network 15, and is converted after the summation network in the converter 17. A combination of the transmission signal modulated on an optical carrier frequency is obtained from the summation network 16. The converter 17 is an envelope detector (photo diode) which eliminates the optical carrier wave, and from the converter 17 there is obtained the original transmission signal. The control logic unit 7 may be administrated such that one or more modules transmit simultaneously. The transmission signal is then applied to the measurement unit 3 via the receiver 2, the amplitude and phase for the transmitter branch of the respective module (the units 10, 11, 12 in FIG. 2) can be measured, and correction signals to the respective module can be calculated and distributed according to the above.

Figure 4:
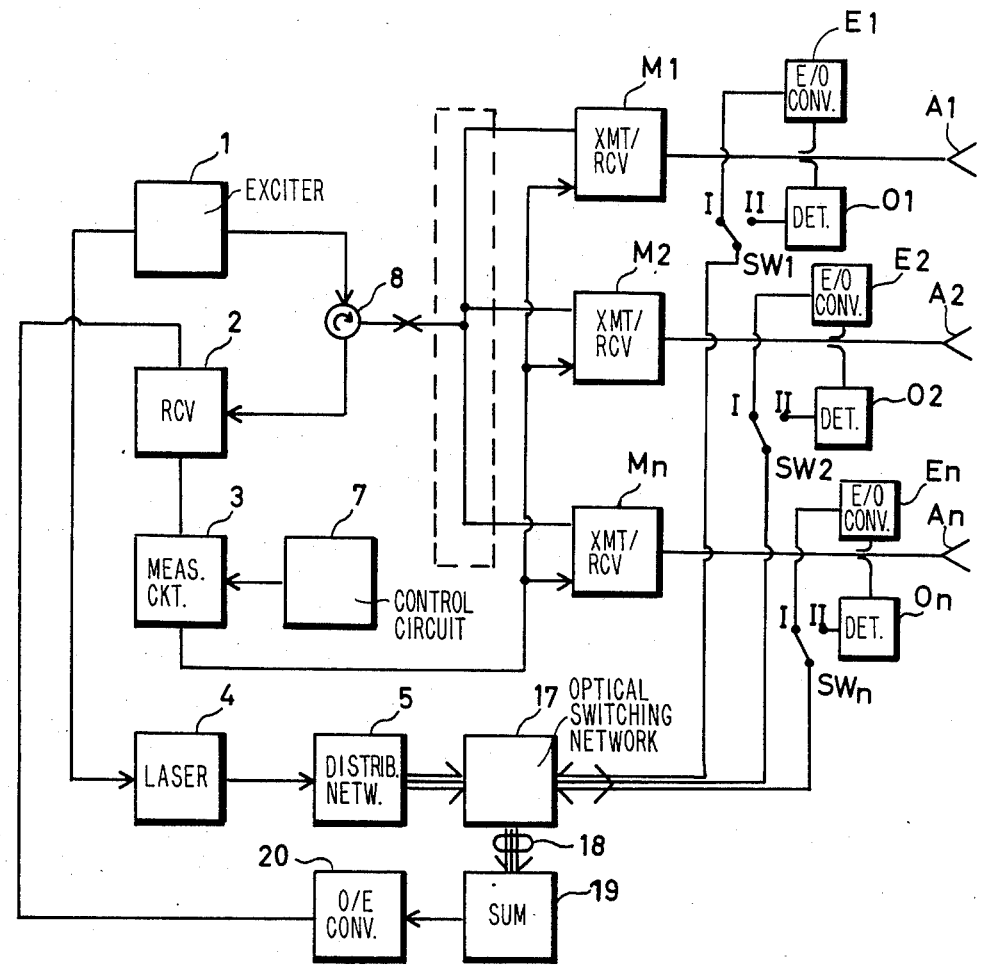
FIG. 4 illustrates an embodiment of the invention for testing both during transmission and reception.

In a further embodiment illustrated in FIG. 4, the same fibre bundle 6 as in FIG. 1 is utilized for the transmission signals also. As in FIG. 3 there are electrooptical converters E1-En connected (with the aid of direction switches) to the outputs of the modules M1-Mn. A switch SW1-SWn is connected to the output of each converter for being in mode I—I (cf FIG. 2) in the transmission mode and in mode II—II in the reception mode. An optical fibre switching network 17 is connected to the output of the distribution network 5, and comprises such as optical relays. The network 17 is then controlled synchronously with the switches SW1-SWn. The fibre bundle 18 from the network 17 is connected to a summing network 19 of the same kind as the networks 5 and 15. An optical signal representing the transmission signal from the different modules is taken from the network to an optoelectrical converter 20 of the same kind as the converter 16 according to FIG. 3, and the signal from its output is taken to the receiver 2 and measurement unit 3 of the radar system for processing according to what has been described above.

The optical summing networks 15 and 19, as well as the distribution network 5 may comprise so-called Y switches of a known kind, e.g. such as marketed by CANSTAR under the designation TCS Nx1.

The advantages achieved by the optical fibre transmission above are:

low weight and small volume of the participating units, flexible transmission medium, no phase variations if the fibres are deflected, good temperature properties with regard to the phase progression of the transferred light signals, intensitivity to jamming or noise.

I claim:

1. Test apparatus in a radar system with an electrically controlled aerial having a plurality of aerial elements (A1-An) and containing a plurality of transmitter-receiver modules (M1-Mn) for continuously, and for each module, causing mutual conformity with regard to both amplitude and phase of the radar signals (FIG. 1) from the modules, said signals being received by the central receiver (2) included in the system, characterized by
    (a) a light-generating unit (4) generating a light signal in response to a test signal,
    (b) an optical distribution network (5) for distributing the light signal to a bundle (6) of light conductors ($l_1-l_n$)
    (c) a plurality of optoelectrical converters (O1-On), each assigned to one of said modules (M1-Mn) and optically coupled to each of said light conductors ($l_1-l_n$) for converting the light signals from the light conductors to electrical signals within the radar frequency range.
    (d) a detection and measurement unit (3) connected to the system receiver (2) for measuring, in the reception mode of the modules, the amplitude and phase of the test signal which has passed the module, said measurement being carried out in all modules, and
    (e) a control logic unit (7) for selecting one of said modules as a reference module, an error signal being generated in the measurement unit (3) relative said reference module for each of the modules, said error signal being disposed for correcting amplitude and phase in respective modules relative said reference.

2. Test apparatus in a radar system with an electrically controlled aerial having a plurality of aerial elements (A1-An) and including a plurality of transmitter-receiver modules (M1-Mn) for continuously, and for each module, causing conformity both with regard to amplitude and phase in the radar signals sent via the modules from the central transmitter included in the system, said signals passing via a distribution network (9) said modules of the aerial units (A1-An), characterized by
    (a) a plurality of electrooptical converters (E1-En) coupled to the respective output of said modules (M1-Mn)
    (b) a bundle (15) of light conductors from said converters for conducting the light from the converters (E1-En) to an optical summing circuit (16),
    (c) an optoelectrical converter (17) for converting the optical signal obtained from the summing circuit to an electrical signal which is applied to the system receiver (2),
    (d) a detection and measurement unit (3) connected to the system receiver (2) for measuring in the transmission mode of the modules the amplitude and phase of the transmission signal, by measuring the signal obtained at the receiver (2) from the optoelectrical converter, and
    (e) a control logic unit (7) for selecting one of said modules as a reference module, and generating an error signal in the measurement unit (3) with respect to amplitude and phase relative the selected reference module for remaining modules, said error signal being disposed for correcting amplitude and phase in the respective module.

* * * * *